United States Patent
Contreras et al.

(10) Patent No.: US 8,482,872 B1
(45) Date of Patent: Jul. 9, 2013

(54) DISTRIBUTED TEMPERATURE DETECTOR ARCHITECTURE FOR HEAD DISK INTERFACE SYSTEMS

(75) Inventors: John Thomas Contreras, Palo Alto, CA (US); Rehan Ahmed Zakai, San Ramon, CA (US); Samir Y Garzon, Sunnyvale, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/333,565

(22) Filed: Dec. 21, 2011

Related U.S. Application Data

(63) Continuation-in-part of application No. 12/651,161, filed on Dec. 31, 2009, now Pat. No. 8,098,450.

(51) Int. Cl.
  *G11B 27/36* (2006.01)
  *G11B 21/02* (2006.01)

(52) U.S. Cl.
  USPC .............................................. 360/31; 360/75

(58) Field of Classification Search
  None
  See application file for complete search history.

(56) References Cited

U.S. PATENT DOCUMENTS

| | | |
|---|---|---|
| 6,486,660 B1 | 11/2002 | Luse et al. |
| 7,177,782 B2 | 2/2007 | Falik et al. |
| 7,477,470 B2 | 1/2009 | Leis et al. |
| 7,800,858 B1 * | 9/2010 | Bajikar et al. ................... 360/75 |
| 7,969,685 B2 | 6/2011 | Shen et al. |
| 2005/0174665 A1 | 8/2005 | Zhang et al. |
| 2008/0247095 A1 | 10/2008 | Kim et al. |
| 2011/0069408 A1 | 3/2011 | Kurita et al. |
| 2011/0157736 A1 | 6/2011 | Contreras et al. |
| 2011/0157740 A1 | 6/2011 | Baumgart et al. |

OTHER PUBLICATIONS

EPCOS, "NTC Thermistors", Application Notes, EPCOS AG 2009, 9 pages, Feb. 2009.

* cited by examiner

*Primary Examiner* — Regina N Holder
(74) *Attorney, Agent, or Firm* — Brokaw Patent Law PC; Christopher J. Brokaw; John D. Henkhaus

(57) ABSTRACT

Approaches for a distributed temperature detector architecture in a head disk interface system of a hard-disk drive (HDD). A HDD may include a read/write head comprising a read element and a write element and a read/write integrated circuit (IC). The read/write head may comprise (a) a first temperature sensor that is located relatively near an air bearing surface (ABS) of the read/write head and (b) a second temperature sensor that is offset from the ABS. The read/write IC is configured to detect when the read/write head makes physical contact with a disk based on a difference in temperature measured by the first and second temperature sensor. The first and second temperature sensors form a bridge circuit, such as a Wheatstone bridge, with a first IC resistor and a second IC resistor that both reside in the read/write IC, allowing the temperature of the read/write head to be accurately measured.

19 Claims, 5 Drawing Sheets

DISTRIBUTED TEMPERATURE DETECTOR ARCHITECTURE FOR HEAD DISK INTERFACE SYSTEMS

CLAIM OF PRIORITY AND RELATED APPLICATION DATA

This application is a continuation-in-part of U.S. patent application Ser. No. 12/651,161, entitled "Fly-Height Management in a Hard Disk Drive (HDD)," invented by Peter Baumgart et al., filed on Dec. 31, 2009 now U.S. Pat. No. 8,098,450, the disclosure of which is incorporated by reference in its entirety for all purposes as if fully set forth herein.

This application is related to US. patent application Ser. No. 13/333,518, entitled "Balanced Embedded Contact Sensor with Low Noise Architecture," invented by Samir Garzon et al., filed on the same day herewith, the disclosure of which is incorporated by reference in its entirety for all purposes as if fully set forth herein.

FIELD OF THE INVENTION

Embodiments of the invention relate to a distributed temperature detector architecture for use in a head disk interface system of a hard-disk drive (HDD).

BACKGROUND OF THE INVENTION

A hard-disk drive (HDD) is a non-volatile storage device that is housed in a protective enclosure and stores digitally encoded data on one or more circular disks having magnetic surfaces (a disk may also be referred to as a platter). When an HDD is in operation, each magnetic-recording disk is rapidly rotated by a spindle system. Data is read from and written to a magnetic-recording disk using a read/write head which is positioned over a specific location of a disk by an actuator.

A read/write head uses a magnetic field to read data from and write data to the surface of a magnetic-recording disk. As a magnetic dipole field decreases rapidly with distance from a magnetic pole, the distance between a read/write head and the surface of a magnetic-recording disk must be tightly controlled. An actuator relies on suspension's force on the read/write head to provide the proper distance between the read/write head and the surface of the magnetic-recording disk while the magnetic-recording disk rotates. A read/write head therefore is said to "fly" over the surface of the magnetic-recording disk. When the magnetic-recording disk stops spinning, a read/write head must either "land" or be pulled away onto a mechanical landing ramp from the disk surface.

Resistor temperature detector (RTD) architectures have been used in the prior art to determine when the read/write head makes physical contact with the magnetic-recording disk based upon the temperature of the read/write head. RTD architectures in the prior art have been implemented using a single temperature sensor that measures temperature based on the amount of voltage across a single temperature sensor. However, prior art approaches exhibit an unsatisfactory amount of noise, which complicates accurate measurements.

SUMMARY OF THE INVENTION

Approaches described herein teach a distributed temperature sensing architecture for a head-disk interface (HDI) system. The distributed temperature sensing architecture comprises two different resistive temperature detectors within a head slider which form a bridge circuit with resistors within the read/write integrated circuit (IC). The bridge circuit of an embodiment allows the affect of noise generated at the head slider to be cancelled at the read/write integrated circuit (IC). As a result, accurate temperature measurements of the head slider may be obtained, thereby enabling embodiments to detect physical contact between the head slider and the magnetic-recording disk with greater precision than prior approaches.

In an embodiment of the invention, a hard-disk drive (HDD) comprises a head slider that includes a read element and a write element disposed on an air bearing surface of the head slider. The HDD may further include a magnetic-recording disk rotatably mounted on a spindle and a voice coil motor configured to move the head slider to access portions of said magnetic-recording disk. Additionally, the HDD may include a read/write integrated circuit (IC) configured to condition write signals sent to the write element and amplify read signals from the read element.

The head slider may comprises (a) a first resistive temperature detector (RTD) that is located relatively near the air bearing surface and (b) a second RTD that is offset from the air bearing surface. The read/write IC can be configured to detect when the head slider makes physical contact with the magnetic-recording disk based on a difference in temperature measured by the first RTD and the second RTD.

In an embodiment, the first RTD and the second RTD comprised within the head slider form a bridge circuit with a first IC resistor and a second IC resistor comprised within the read/write IC. The formed bridge circuit from the head and integrated circuit (IC) has the characteristics like a Wheatstone bridge circuit which allows the affect of eliminating intrinsic signals from the head slider's environment and components to be cancelled at the head slider and read/write IC.

Embodiments discussed in the Summary of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for a distributed temperature sensing architecture for a head-disk interface (HDI) system are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, wellknown structures and devices are shown in block diagram form in order to avoid unnecessarily obscuring the embodiments of the invention described herein.

Physical Description of Illustrative Embodiments of the Invention

Figure 1:
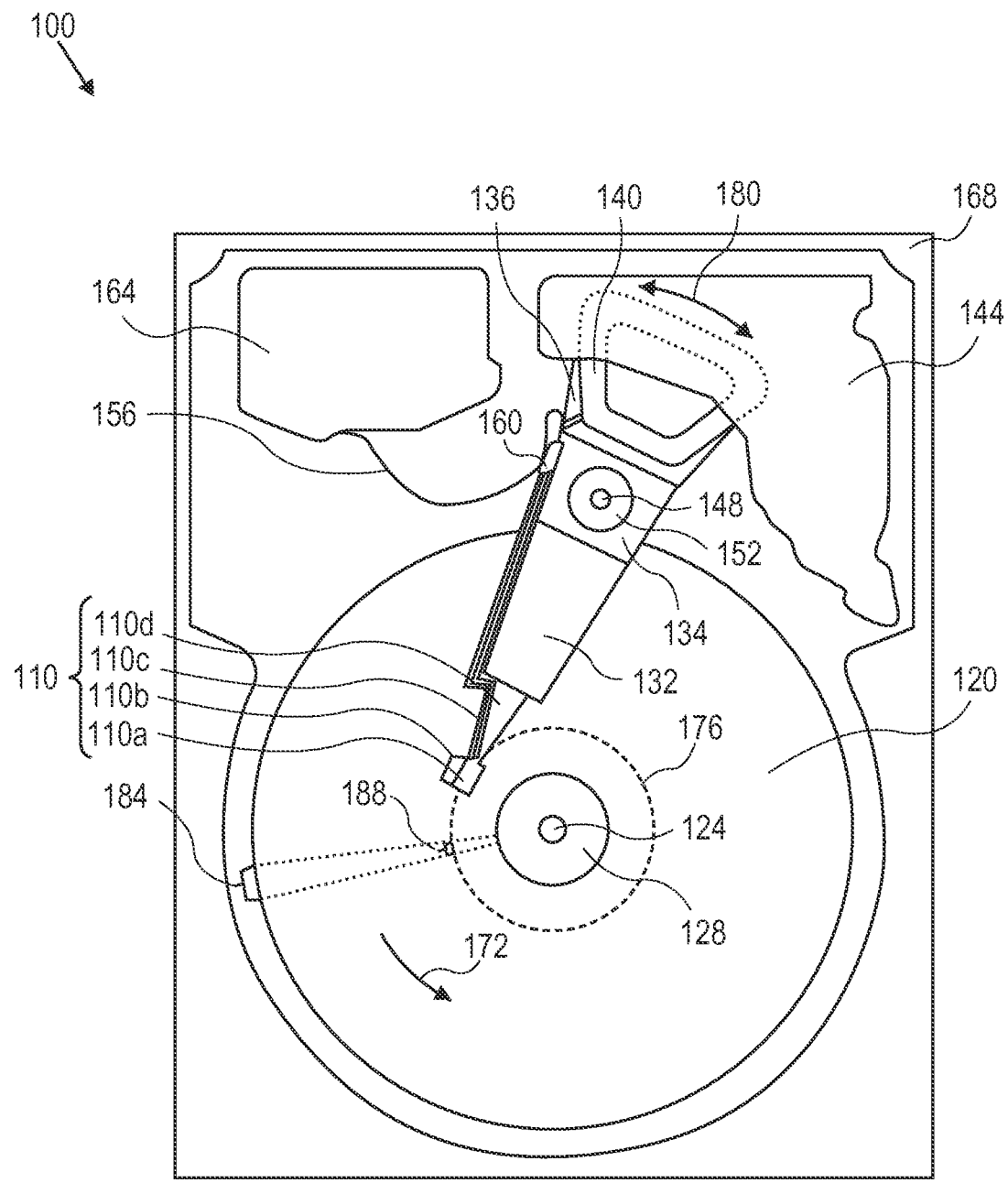
FIG. 1 is a plan view of an HDD according to an embodiment of the invention.

Embodiments of the invention may be used to measure the temperature of the head slider's air-bearing surface (ABS) with greater precision than prior approaches. Embodiments of the invention may be incorporated with a hard-disk drive (HDD). In accordance with an embodiment of the invention, a plan view of a HDD 100 is shown in FIG. 1. FIG. 1 illustrates the functional arrangement of components of the HDD including a slider 110b that includes a magnetic-reading/recording head 110a. Collectively, slider 110B and head 110a may be referred to as a head slider. The HDD 100 includes at least one head gimbal assembly (HGA) 110 including the head 110a, a lead suspension 110c attached to the head 110a, and a load beam 110d attached to the slider 110b, which includes the head 110a at a distal end of the slider 110b; the slider 110b is attached at the distal end of the load beam 110d to a gimbal portion of the load beam 110d. The HDD 100 also includes at least one magnetic-recording disk 120 rotatably mounted on a spindle 124 and a drive motor (not shown) attached to the spindle 124 for rotating the disk 120. The head 110a includes a write element and a read element for respectively writing and reading information stored on the disk 120 of the HDD 100. The disk 120 or a plurality (not shown) of disks may be affixed to the spindle 124 with a disk clamp 128. The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not shown); the armature 136 of the VCM is attached to the carriage 134 and is configured to move the arm 132 and the HGA 110 to access portions of the disk 120 being mounted on a pivot-shaft 148 with an interposed pivot-bearing assembly 152.

With further reference to FIG. 1, in accordance with an embodiment of the present invention, electrical signals, for example, current to the voice coil 140 of the VCM, write signal to and read signal from the PMR head 110a, are provided by a flexible cable 156. Interconnection between the flexible cable 156 and the head 110a may be provided by an arm-electronics (AE) module 160, which may have an onboard pre-amplifier for the read signal, as well as other read-channel and write-channel electronic components. The flexible cable 156 is coupled to an electrical-connector block 164, which provides electrical communication through electrical feedthroughs (not shown) provided by an HDD housing 168. The HDD housing 168, also referred to as a casting, depending upon whether the HDD housing is cast, in conjunction with an HDD cover (not shown) provides a sealed, protective enclosure for the information storage components of the HDD 100.

With further reference to FIG. 1, in accordance with an embodiment of the present invention, other electronic components (not shown), including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the disk 120 that is affixed to the spindle 124 by the disk clamp 128; as a result, the disk 120 spins in a direction 172. The spinning disk 120 creates a cushion of air that acts as an air-bearing on which the ABS of the slider 110b rides so that the slider 110b flies above the surface of the disk 120 without making contact with a thin magnetic-recording medium of the disk 120 in which information is recorded. The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the disk 120. Information is stored on the disk 120 in a plurality of concentric tracks (not shown) arranged in sectors on the disk 120, for example, sector 184. Correspondingly, each track is composed of a plurality of sectored track portions, for example, sectored track portion 188. Each sectored track portion 188 is composed of recorded data and a header containing a servo-burst-signal pattern, for example, sequenced servo-burst-signal patterns (A,B,C, & D pattern types) for adjusting the voice coil 140, signal information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

Embodiments of the invention also encompass HDD 100 that includes the HGA 110, the disk 120 rotatably mounted on the spindle 124, the arm 132 attached to the HGA 110 including the slider 110b including the head 110a.

Figure 2:
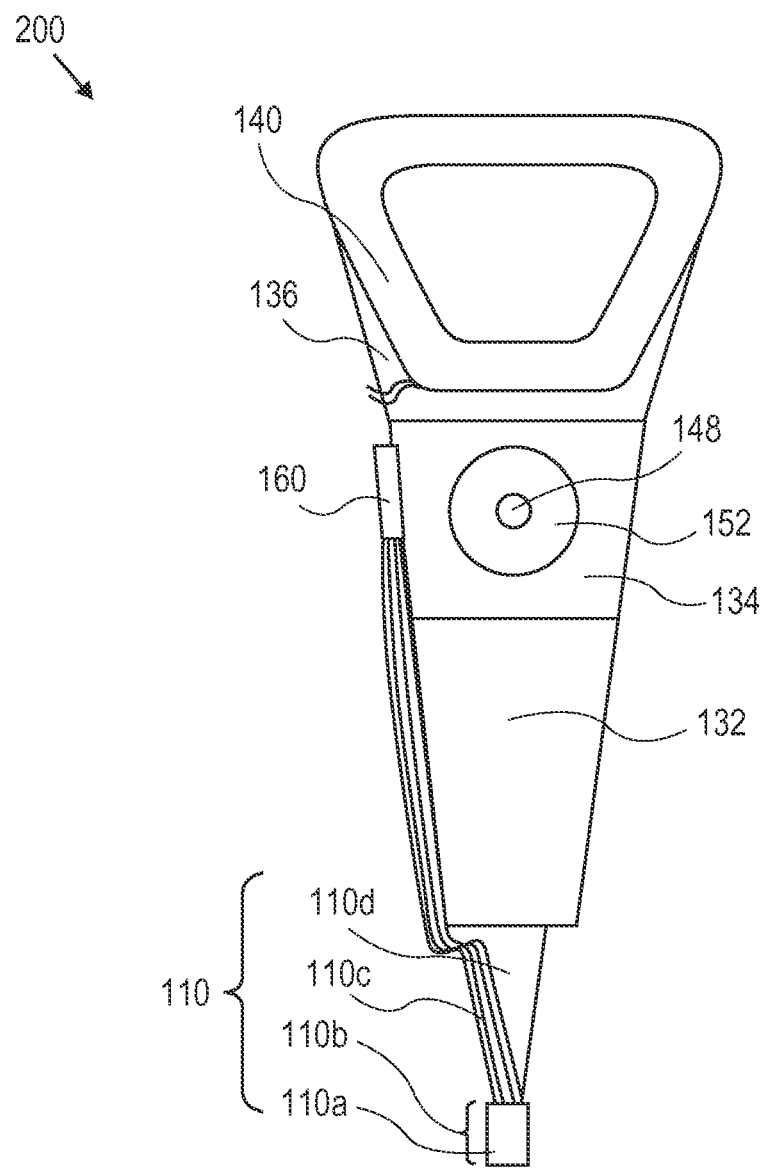
FIG. 2 is a plan view of a head-arm-assembly (HAA) according to an embodiment of the invention.

With reference now to FIG. 2, in accordance with an embodiment of the present invention, a plan view of a head-arm-assembly (HAA) including the HGA 110 is shown. FIG. 2 illustrates the functional arrangement of the HAA with respect to the HGA 110. The HAA includes the arm 132 and HGA 110 including the slider 110b including the head 110a. The HAA is attached at the arm 132 to the carriage 134. In the case of an HDD having multiple disks, or platters as disks are sometimes referred to in the art, the carriage 134 is called an "E-block," or comb, because the carriage is arranged to carry a ganged array of arms that gives it the appearance of a comb. As shown in FIG. 2, the armature 136 of the VCM is attached to the carriage 134 and the voice coil 140 is attached to the armature 136. The AE 160 may be attached to the carriage 134 as shown. The carriage 134 is mounted on the pivot-shaft 148 with the interposed pivot-bearing assembly 152.

Figure 3:
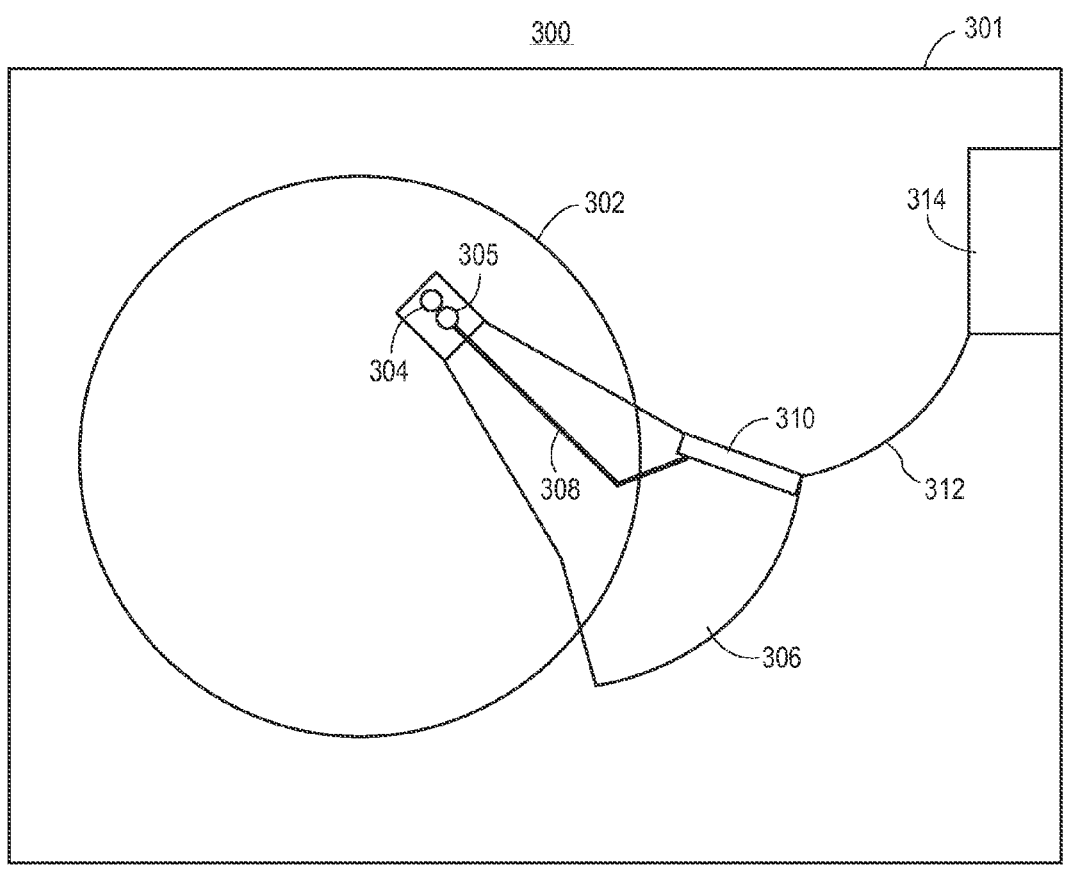
FIG. 3 is an illustration of a read/write circuit within an HDD according to an embodiment of the invention.

FIG. 3 is an illustration of a read/write circuit 310 within an HDD according to an embodiment of the invention. FIG. 3 depicts hard-disk drive (HDD) 300 which includes enclosure 301 that contains one or more magnetic platters or disks 302, read elements 304, write elements 305, an actuator arm suspension 306, a transmission line interconnect 308, a read/write integrated circuit (IC) 310, a flexible interconnect cable 312, and a disk enclosure connector 314.

Electrical signals are communicated between the read/write elements and read/write integrated circuit 310 over transmission line interconnect 308. Read/write integrated circuit 310 conditions the electrical signals so that they can drive write element 305 during writing and amplifies the electrical signal from read element 304 during reading. Signals are communicated between read/write integrated circuit 310 and disk enclosure connector 314 over flexible cable 312. Disk enclosure connector 314 conducts signals with circuitry external to disk enclosure 301. In other embodiments, read/write integrated circuit (IC) 310 is located elsewhere than depicted in FIG. 3, such as on flex cable 312 or on printed circuit board (PCB) within the hard-disk drive.

Distributed Temperature Sensing Architecture

Figure 4:
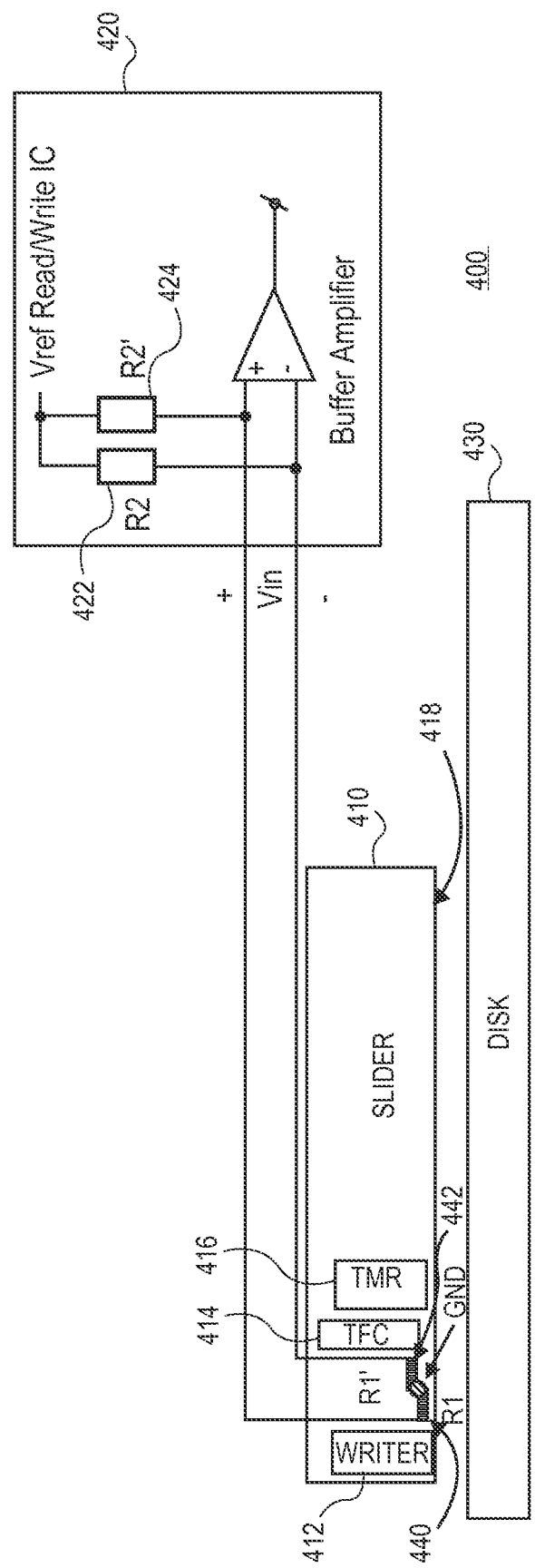
FIG. 4 is an illustration of bridge circuit comprising resistors residing within both the head slider and the read/write IC according to an embodiment of the invention.

FIG. 4 is an illustration of a distributed temperature sensing architecture 400 according to an embodiment of the invention. Distributed temperature sensing architecture 400 may be incorporated as part of HDD 100 of FIG. 1. FIG. 4 depicts a head slider 410, read/write IC 420, and a magnetic-recording disk 430. Head slider 410 comprises a write element 412, a thermal fly height control (TFC) 414, and a read element 416. Note that write element 412 and read element 416 are disposed face the air-bearing surface (ABS) 418 of head slider 410.

Head slider 410 comprises two different temperature sensors, namely resistive temperature detector (RTD) 440 and 442. In an embodiment, RTDs 440 and 442 may each be embodied as a thermistor. RTDs 440 and 442 may be composed of, but not limited to, metallic (e.g., NiFe) and semiconductor materials. RTDs 440 and 442 may measure temperature based on the amount of voltage across the corresponding resistive temperature detector. Changes in temperature cause a change in the amount of resistance provided by a resistive temperature detector. A small increase in temperature will result in an increase in voltage across a resistive temperature detector. Thus, the amount of voltage across a resistive temperature detector may be used to identify the temperature associated with that resistive temperature detector. In FIG. 4, RTD 440 and RTD 442 may each provide the same amount of resistance for a given temperature.

As shown in FIG. 4, RTD 440 is located on or proximate to air bearing surface 418 while the position of RTD 442 is offset from air bearing surface 418 or embedded within head slider 410. When physical contact is made between head slider 410 and magnetic-recording disk 430 when magnetic-recording disk 430 is rotating, the resulting friction causes an increase in temperature within head slider 410 originating at the point of contact. The change in temperature resulting from the physical contact will be a gradient as a function of distance from the point of contact.

The particular distance which RTD 442 should be offset from air bearing surface 418 should be equal to a distance where RTD 442 does not measure the full effect of the change in temperature resulting from friction caused by physical contact between head slider 410 and magnetic-recording disk 430, but still within close enough proximity to detect changes in temperature due to TFC 414 or write signals to write element 412. For example, in one embodiment, a distance of a few hundred microns may exist between RTD 442 and air bearing surface 418.

As RTD 440 is in close proximity to air bearing surface 418, when physical contact is made between a portion of head slider 410 (which most likely will be at write element 412), RTD 440 will detect an increase in temperature due to the resulting friction from the physical contact. Since RTD 442 is offset from air bearing surface 418, when physical contact is made between a portion of head slider 410 and magnetic-record disk 430, RTD 442 will not detect an increase in temperature due to the resulting friction from the contact of the same magnitude as RTD 440.

Thus, in an embodiment, read/write IC 420 may be configured to detect when head slider 410 makes physical contact with magnetic-recording disk 430 based on a difference in temperature measured by temperature sensor 440 and temperature sensor 442.

However, given the physical location of RTDs 440 and 442 in head 410 slider, changes in temperature due to the ambient environment or caused by the thermal fly height control (TFC) or the write signals to the write element will affect temperature sensors 440 and 442 equally. Thus, an increase in temperature that is measured by both temperature sensors 440 and 442 may be attributed to these causes, rather than a physical contact between head 410 slider and magnetic-recording disk 430. Using the relative difference between the temperatures measured by RTD 440 and RTD 442 as a means to detect physical contact between head slider 410 and disk 430 removes or reduces any noise or inaccurate introduced or caused by temperature changes that affect both RTD 440 and RTD 442 substantially equally, such as heating caused by TFC 414, write element 412, self-heating, and/or lasers used to warm disk 430.

Using a Distributed Bridge

In an embodiment, RTDs 440 and 442 may form a bridge circuit with two resistors located within read/write IC 420. For example, FIG. 4 depicts RTDs 440 and 442 in a bridge circuit with IC resistor 422 and IC resistor 424 that reside in read/write IC 420 according to an embodiment of the invention.

The distributed bridge circuit formed by RTDs 440 and 442 (located within head slider 410) and IC resistors 422 and 424 (located within read/write IC 420) form a Wheatstone bridge type circuit. In such an embodiment, equal current should flow on both arms of the Wheatstone bridge absent a temperature change detected by one or more of RTDs 440 and 442. Thus, in the Wheatstone bridge circuit, both arms of the circuit should provide the same amount of resistance.

In an embodiment, RTDs 440 and 442 provide low levels of noise, e.g., the signal-to-noise ratio for RTDs 440 and 442 may be about 30 dB. Indeed, the noise level of RTDs 440 and 442 is low enough where, in certain implementations, the circuit architecture itself becomes the biggest noise contributor. Advantageously, noise in the Wheatstone bridge circuit originating at head slider 410 and carried by both arms of the circuit bridge will be cancelled at the read/write IC 420. As a result, accurate temperature measurements of head slider 410 may be obtained, thereby enabling embodiments to detect physical contact between the head slider and the magnetic-recording disk with greater precision.

In an embodiment employing a Wheatstone bridge type circuit, read/write IC 420 may measure the differential-mode voltage of the Wheatstone bridge circuit to identify the relative temperature difference between RTD 440 and RTD 442. This relative difference between measured temperatures can be used to identify when head slider 410 makes physical contact with magnetic-recording disk 430, since once such contact is made RTD 440 will measure a higher temperature than RTD 442. By read/write IC 420 measuring the common-mode voltage of the Wheatstone bridge circuit, read/write IC 420 may identify changes in temperature due to the ambient environment, a thermal fly height control (TFC), or the write signals to the write element, since such temperature changes affect both RTDs 440 and 442 equally.

Filtering for Signal Detection

Figure 5:
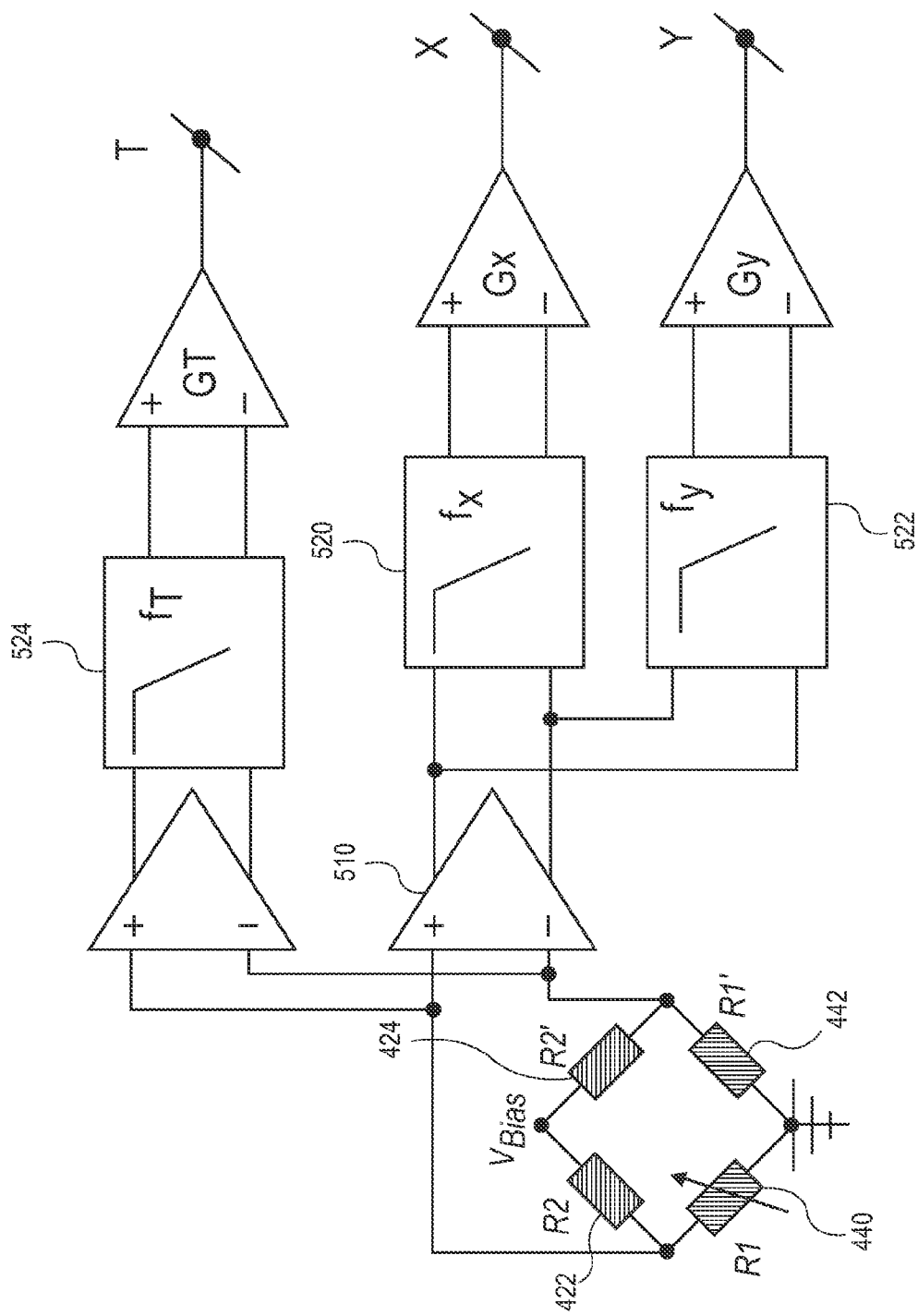
FIG. 5 is an illustration of a temperature sensing architecture having different filter blocks for signal detection according to an embodiment of the invention.

FIG. 5 is an illustration of a temperature sensing architecture having different filter blocks for signal detection according to an embodiment of the invention. RTDs 440 and 442 residing in head slider 410 are depicted in FIG. 5 as well as resistors 422 and 424 residing in read/write IC 420. FIG. 5 also depicts low noise buffer amplifier 510. Low noise buffer amplifier 510 may be a DC coupled amplifier, as no high pass filtering is required.

In FIG. 5, the half bridge circuit that includes RTDs 422 and 424 can be tuned by placing switch FETs on different resistances such that resistance imbalances in RTDs 440 and 442 is zeroed at low noise buffer amplifier 510. One skilled in the art can add such switches for a zero-offset scheme.

The differential mode of the bridge circuit may be used to monitor the fly height of head slider 410. Filter block 520 measures a low-frequency signal response from the bridge circuit to detect physical contact between head slider 410 and disk 430 with great sensitivity. Filter block 522 measures a high-frequency signal response from the bridge circuit to measure disk topography features, such as asperities.

The common mode of the bridge circuit may be used to monitor the temperature of head slider 410. Filter block 524 may be used to measure the temperature of head slider 410 using the common mode voltage of the bridge circuit.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A hard-disk drive, comprising:
    a head slider comprising a read element and a write element disposed on an air bearing surface;
    a magnetic-recording disk rotatably mounted on a spindle;
    a voice coil motor configured to move the head slider to access portions of said magnetic-recording disk; and
    a read/write integrated circuit (IC) configured to condition write signals sent to the write element and amplify read signals from the read element,
    wherein the head slider comprises (a) a first resistive temperature detector (RTD) that is located relatively near the air bearing surface and (b) a second RTD that is offset from the air bearing surface,
    wherein the read/write IC is configured to detect when the head slider makes physical contact with the magnetic-recording disk based on a difference in temperature measured by the first RTD and the second RTD, and
    wherein the first RTD and the second RTD comprised within the head slider form a bridge circuit with a first IC resistor and a second IC resistor comprised within the read/write IC, and
    wherein a common mode voltage of the bridge circuit is used to measure the temperature of the head slider while a differential mode voltage of the bridge circuit is used to measure a low-frequency signal from a first path of the bridge circuit to detect physical contact between the head slider and the disk and to measure a high-frequency signal from a second path of the bridge circuit to measure disk topography features.

2. The hard-disk drive of claim 1, wherein the temperature measured by the first RTD or the second RTD is based on an amount of voltage across the first RTD or the second RTD respectively.

3. The hard-disk drive of claim 1, wherein the first RTD and the second RTD provide the same amount of resistance.

4. The hard-disk drive of claim 1, wherein the bridge circuit is a Wheatstone bridge type circuit.

5. The hard-disk drive of claim 1, wherein the first temperature sensor and the second temperature sensor are physically located within the read/write head such that temperatures changes due to the ambient environment, a thermal fly height control (TFC), or the write signals to the write element affect the first temperature sensor and the second temperature sensor equally.

6. The hard-disk drive of claim 1, wherein the bridge circuit comprises two arms which have an equal amount of resistance.

7. The hard-disk drive of claim 1, wherein the bridge circuit comprises two arms, and wherein noise generated by the two arms is cancelled out by the bridge circuit.

8. A head-gimbal assembly (HGA), comprising:
    a head slider comprising a read element and a write element disposed on an air bearing surface; and
    a suspension coupled to the head slider,
    wherein the head slider comprises (a) a first resistive temperature detector (RTD) that is located relatively near the air bearing surface and (b) a second RTD that is offset from the air bearing surface, and
    wherein conductive paths within the head slider are adapted to cause the first RTD and the second RTD to form a bridge circuit with a first IC resistor and a second IC resistor comprised within a read/write IC,
    wherein a common mode voltage of the bridge circuit is used to measure the temperature of the head slider while a differential mode voltage of the bridge circuit is used to measure a low-frequency signal from a first conductive path of the bridge circuit to detect physical contact between the head slider and the disk and to measure a high-frequency signal from a second conductive path of the bridge circuit to measure disk topography features.

9. The head-gimbal assembly (HGA) of claim 8, wherein the read/write IC is configured to detect when the head slider makes physical contact with the magnetic-recording disk based on a difference in temperature measured by the first RTD and the second RTD.

10. The head-gimbal assembly (HGA) of claim 8, wherein the first RTD and the second RTD provide the same amount of resistance.

11. The head-gimbal assembly (HGA) of claim 8, wherein the bridge circuit is a Wheatstone bridge type circuit.

12. The head-gimbal assembly (HGA) of claim 8, wherein the first temperature sensor and the second temperature sensor are physically located within the read/write head such that temperatures changes due to the ambient environment, a thermal fly height control (TFC), or the write signals to the write element affect the first temperature sensor and the second temperature sensor equally.

13. The head-gimbal assembly (HGA) of claim 8, wherein the bridge circuit comprises two arms which have an equal amount of resistance.

14. A head-arm assembly (HAA), comprising:
    a head slider comprising a read element and a write element disposed on an air bearing surface; and
    a suspension coupled to the head slider; and
    an arm adapted to support the suspension, wherein the head slider comprises (a) a first resistive temperature detector (RTD) that is located relatively near the air bearing surface and (b) a second RTD that is offset from the air bearing surface, and wherein conductive paths within the head slider are adapted to cause the first RTD and the second RTD to form a bridge circuit with a first IC resistor and a second IC resistor comprised within a read/write IC, wherein a common mode voltage of the bridge circuit is used to measure the temperature of the head slider while a differential mode voltage of the bridge circuit is used to measure a low-frequency signal from a first conductive path of the bridge circuit to detect physical contact between the head slider and the disk and to measure a high-frequency signal from a second conductive path of the bridge circuit to measure disk topography features.

15. The head-arm assembly (HAA) of claim 14, wherein the read/write IC is configured to detect when the head slider makes physical contact with the magnetic-recording disk based on a difference in temperature measured by the first RTD and the second RTD.

16. The head-arm assembly (HAA) of claim 14, wherein the first RTD and the second RTD provide the same amount of resistance.

17. The head-arm assembly (HAA) of claim 14, wherein the bridge circuit is a Wheatstone bridge type circuit.

18. The head-arm assembly (HAA) of claim 14, wherein the first temperature sensor and the second temperature sensor are physically located within the read/write head such that temperatures changes due to the ambient environment, a thermal fly height control (TFC), or the write signals to the write element affect the first temperature sensor and the second temperature sensor equally.

19. The head-arm assembly (HAA) of claim 14, wherein the bridge circuit comprises two arms which have an equal amount of resistance.

* * * * *